US006374283B1

(12) United States Patent
Chessell et al.

(10) Patent No.: US 6,374,283 B1
(45) Date of Patent: Apr. 16, 2002

(54) APPARATUS, METHOD & COMPUTER PROGRAM PRODUCT FOR CLIENT/ SERVER COMPUTING WITH CLIENT SELECTABLE LOCATION OF TRANSACTION OBJECTS

(75) Inventors: Amanda Elizabeth Chessell, Alton; Kathryn Sarah Warr, Winchester, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/265,910

(22) Filed: Mar. 10, 1999

(30) Foreign Application Priority Data

Mar. 31, 1998 (GB) .............................................. 9806779

(51) Int. Cl.[7] .................................................. G06F 9/00

(52) U.S. Cl. ........................ 709/101; 709/227; 709/228; 707/10; 707/203

(58) Field of Search ................... 707/10, 203; 709/101, 709/227, 228

(56) References Cited

U.S. PATENT DOCUMENTS

| | | | | |
|---|---|---|---|---|
| 5,089,954 A | | 2/1992 | Rago | 395/600 |
| 5,404,523 A | * | 4/1995 | DellaFera et al. | 707/10 |
| 5,424,938 A | | 6/1995 | Wagner et al. | 364/408 |
| 5,774,668 A | * | 6/1998 | Choquier et al. | 707/104 |
| 6,012,059 A | * | 1/2000 | Neimat et al. | 707/10 |

FOREIGN PATENT DOCUMENTS

WO WO 97 40457 10/1997

OTHER PUBLICATIONS

A Wolisz et al, "Service Provider Selection in an Open Services Environment", Proceedings—Second IEEE Workshop on Future Trends of Distributed Computing Systems, Cairo, Egypt, Sep. 30–Oct. 2 1990, pp 229–235.

D H Steves et al, "Properties of Secure Transaction Protocols", Computer Networks and ISDN Systems, vol. 29, No. 15, Nov. 1997, pp 1809–1821.

"Asynchronous Progressive Transaction Recovery Protocol for Distributed DB/DC Systems", IBM Technical Disclosure Bulletin, vol. 29, No. 12, May 1987, pp 5385–5392.

* cited by examiner

*Primary Examiner*—Hosain T. Alam
*Assistant Examiner*—Cam-Y Truong
(74) *Attorney, Agent, or Firm*—Jerry W. Herndon

(57) ABSTRACT

A client processing apparatus for use in a client/server computing system which carries out transactions, the apparatus having: a means for issuing a begin command to signify the beginning of a transaction; a means for sending a command to a an object in a remote server, the command including a transaction context having a specific value which indicates that a transaction has been started but transaction objects which represent the transaction have not yet been created; and a means for receiving a modified transaction context from the remote server once the remote server has created the transaction objects.

12 Claims, 4 Drawing Sheets

APPARATUS, METHOD & COMPUTER PROGRAM PRODUCT FOR CLIENT/SERVER COMPUTING WITH CLIENT SELECTABLE LOCATION OF TRANSACTION OBJECTS

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2", are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA—the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g., 10) communicating with one particular server computer (e.g., 20) over a series of client requests which are processed by the server. The OMG's OTS is responsible for coordinating these distributed transactions.

Usually, an application running on a client process begins a transaction which may involve calling a plurality of different servers, each of which will initiate a server process to make changes to its local database according to the instructions contained in the transaction. The transaction finishes by either committing the transaction (and thus all servers finalize the changes to their local databases) or aborting the transaction (and thus all servers "rollback" or ignore the changes to their local databases). To communicate with the servers during the transaction (e.g., instructing them to either commit or abort their part in the transaction) one of the processes involved must maintain state data for the transaction. This usually involves the process to set up a series of transaction objects, one of which is a coordinator object which coordinates the transaction with respect to the various servers.

A conventional implementation of the OTS, which was developed by the International Business Machines Corporation and included in its Component Broker Series (a trademark of the IBM Corp.) product announced in May of 1997, is shown in FIG. 2. A client process 21 which wants to begin a transaction (e.g., to withdraw money from a bank account) needs to locate a process which is capable of creating and holding the transaction objects that will maintain the state of the transaction. As the modern tendency is to create clients that are "thin" (and thus have only the minimum functionality), the client process 21 will usually not be able to maintain the transaction objects locally and must look for a server process for this purpose.

According to this prior art approach, the OTS (or another service, such as the CORBA Lifecycle service) locates a server process and creates the transaction objects 221 (which include the Coordinator, Control and Terminator objects) on the located server process. The same server process (server A process 22 in FIG. 2) is always chosen according to this prior art. Upon locating the server A process 22, client process 21 sends (arrow with encircled number 1) a message to server A process 22 to instruct server A process 22 to create the transaction objects 221. Server A process 22 then creates transaction objects 221 and sends a reply (arrow with encircled number 2) containing the transaction context to client 21. Client 21 then sends a debit bank account command (arrow with encircled number 3) to server B process 23 (the process containing the bank account object 231 which the client process 21 wishes to withdraw money from). This latter command carries with it the transaction context supplied to the client 21 by the server A process 22. In this way, the bank account object 231 in process 23 can register itself (arrow with encircled number 4) with the transaction objects 221 in process 22 so that the bank account object 231 can be commanded (arrow with encircled number 5) to commit or rollback by the transaction objects 221 at the end of the transaction.

This implementation is inefficient in at least two respects. First, since the same server process is always used when a client is locating a remote process to create and maintain the transaction objects, this server process will soon become overloaded and thus unable to efficiently carry out its own tasks (e.g., updating the contents of local resources). Second, many cross process flows exist between the various processes involved in the transaction. Even if the transaction objects are created and maintained on a random server, the problem of a high number of cross process calls still exists.

Further, this implementation does not give the client any choice in the matter concerning which server will be used to locate the transaction objects. The client could try to find a transaction factory (CosTransaction::TransactionFactory) on a server where the client would like to set up the transaction objects, call a create method on the factory and finally call the CosTransactions::Current::resume( ) method to make the transaction "current", but this involves many processing steps on the part of the client. It would be much easier if the client could use the much simpler CosTransactions::Current interface and still be able to select the server upon which to locate the transaction objects, but the present state of the art does not allow this.

SUMMARY OF THE INVENTION

According to a first aspect, the present invention provides a client processing apparatus for use in a client/server computing system which carries out transactions, the apparatus having: a means for issuing a begin command to signify the beginning of a transaction; a means for sending a command to an object in a remote server, the command including a transaction context having a specific value which indicates that a transaction has been started but transaction objects which represent the transaction have not yet been created; and a means for receiving a modified transaction context from the remote server once the remote server has created the transaction objects.

Preferably, the specific value is a NULL value. Preferably, the client processing apparatus further includes a means for selecting a remote server which it determines to be best suited for creating the transaction objects, and wherein the means for sending a command directs the command to an object in the remote server selected by the means for selecting. Preferably, the means for selecting determines which remote server has a resource which is updated in the transaction and selects this remote server as the server that is best suited for creating the transaction objects.

In one embodiment of the invention, the means for sending sends a command to a dummy business object, while in another embodiment the means for sending sends a command corresponding to a dummy method on an object.

According to a second aspect, the present invention provides a server processing apparatus for use in a client/server computing system which carries out transactions, the apparatus having: a means for receiving a command from a client directed to an object located in said server processing apparatus, the command including a transaction context having a specific value which indicates that a transaction has been started by the client but transaction objects which represent the transaction have not yet been created; and a means for recognizing the specific value in the transaction context and for locally creating the transaction objects in response to the specific value.

According to a third aspect, the invention provides a method of carrying out the functionality of the client described above in the first aspect.

According to a fourth aspect, the invention provides a method of carrying out the functionality of the server described above in the second aspect.

According to a fifth aspect, the invention provides a computer program product for, when run on a computer, carrying out the functionality of the first aspect.

According to a sixth aspect, the invention provides a computer program product for, when run on a computer, carrying out the functionality of the second aspect.

Since the client can easily select which server in which the transaction objects are created, such objects can be, for example, selected to be created in the server process which will be substantively involved in carrying out the transaction (e.g., has resources that are involved in the transaction) the number of cross process flows is greatly reduced. This can be clearly seen by a simple comparison of FIGS. 2 (the prior art) and 3 (preferred embodiment of the present invention). FIG. 2 has five cross process calls while FIG. 3 has only two.

BRIEF DESCRIPTION OF THE DRAWINGS

The invention will be better understood by the below description of preferred embodiments thereof to be read while referring to the following figures.

DETAILED DESCRIPTION OF THE PREFERRED EMBODIMENTS

The Common Object Request Broker (CORBA) Object Transaction Service (OTS) supplies an interface object known as "Current" which has a "begin" method used by client application programs (source code) to signal a beginning of a transaction to the underlying software layers. According to the preferred embodiment of the present invention, when the client application is being built or executed on a particular client architecture and contains the "begin" method, the underlying software will proceed appropriately to create the transaction by setting up the transaction state objects in a server that is substantively involved in the transaction (e.g., a server that has server resources involved in the transaction).

Figure 3:
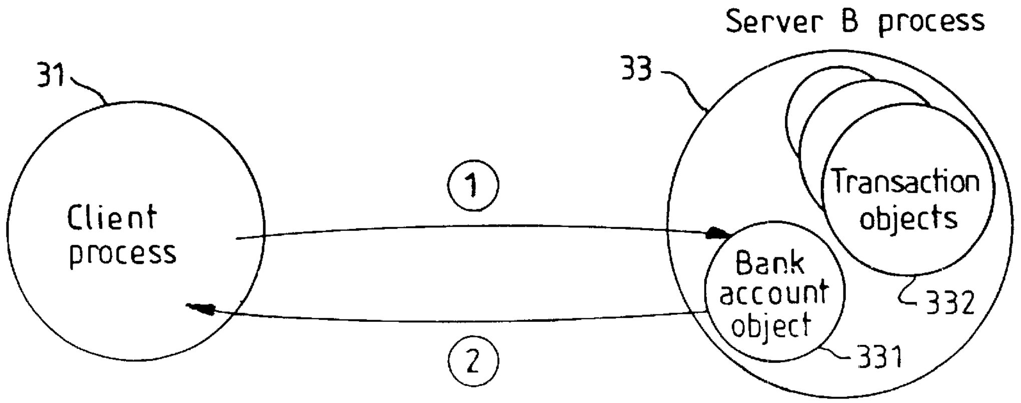
FIG. 3 is a block diagram showing an OTS implementation according to a preferred embodiment of the present invention.
Figure 4:
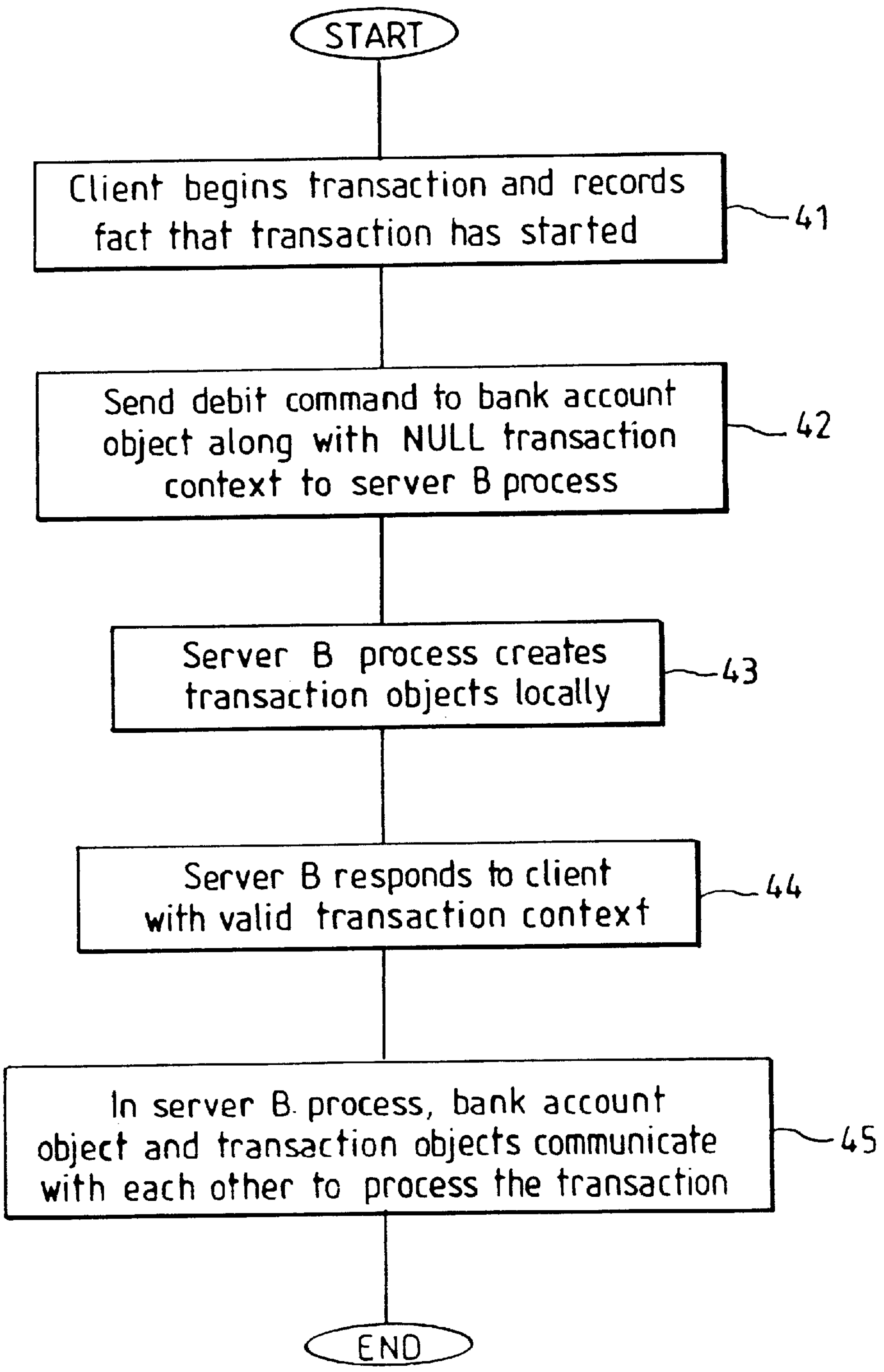
FIG. 4 is a flowchart showing the steps which take place when a client issues a begin command according to the OTS implementation of FIG. 3.

In the preferred embodiment of the present invention, an application running in client process 31 (see FIG. 3) begins a transaction, as usual, by calling the "begin" method on the Current interface object. The client process then records the fact that it has issued this command by, for example, locally creating a minimum set of objects. The above action is illustrated at step 41 of the flowchart of FIG. 4. In this illustrative example, it will be assumed that the transaction being carried out is a withdrawal of money from a bank account, a common transactional operation that is carried out on a daily basis, worldwide, using an Automated Teller Machine (ATM) as the client.

It should be noted that in the prior art, at this stage, a remote process 22 was located and the transaction objects (221 in FIG. 2) were created in that remote process 22. The present invention delays the creation of these transaction objects until a later time, as will be explained below.

The application running in the client process 31 then issues a debit command to bank account object 331 in server B process 33, as the first substantive part of the withdrawal transaction. In this example, the debit command is the first remote flow that the client process makes, in the transaction, after issuing the "begin" command. In making this command, the client process must include some transaction context in the command, so that the bank account object 331 will know that the command is part of a transaction and to identify the specific transaction.

In the prior art (FIG. 2) the client process 21 received the transaction context from the transaction objects 221 set up in the remote process 22. In the preferred embodiment of the present invention, however, the transaction objects have not yet been created and thus could not have provided the client process with the transaction context. Thus, in the preferred embodiment, when the client process 31 sends the debit command to bank account object 331 in remote process 33, a specific transaction context (e.g., a NULL transaction context) is included in the command (arrow with encircled number 1 in FIG. 3). A NULL transaction context means that all of the fields of the transaction context are set to zero. This specific transaction context signifies that a transaction has been started but the transaction objects have not yet been created. This latter operation is illustrated at step 42 in the flowchart of FIG. 4.

When server B process 33 recognizes this specific transaction context (e.g., the NULL transaction context), it is informed that a transaction has been started but the transaction objects have not yet been created. Server B process 33 then creates the transaction objects 332 locally (step 43). Now that the transaction objects 332 are created, the transaction now has a valid transaction context and such a valid transaction context is assigned to the transaction. Server B process then sends a reply (arrow with encircled number 2) to client process 31 to inform the client process 31 of the valid transaction context (step 44 in FIG. 4). Now, the client process has full knowledge of the created transaction.

At this stage, the bank account object 331 communicates (step 45) with the transaction objects 332 in the usual way, except that all of such communication takes place within the same process and thus no cross process flows are required for such communication. In the example, the communications that take place involve the bank account object 331 registering with the transaction objects 332 and, when the transaction is finished, the transaction objects 332 send a commit or rollback command to the bank account object 331.

The client may call other servers to take part in the transaction and these other servers will have to register with the transaction objects created in server B process resulting in some cross process flows between the servers. However, use of the invention by a client minimizes the total number of cross process flows since at least the interaction between the local resources in server B process and the transaction objects will not result in any cross process flows. Also, for a transaction which involves only one server process, the only cross process flows that exist will be those between the client process and this single server process.

In an alternative embodiment, the server B process 33 could create the transaction objects at a later time, for example, during resource registration, rather than as soon as the NULL transaction context enters server B process 33.

While a NULL transaction context (with all fields set to zero) has been used in the illustrative embodiment, other specific values of transaction context could also be used. For example, the private data fields of the transaction context could be set to particular values.

Figure 1:
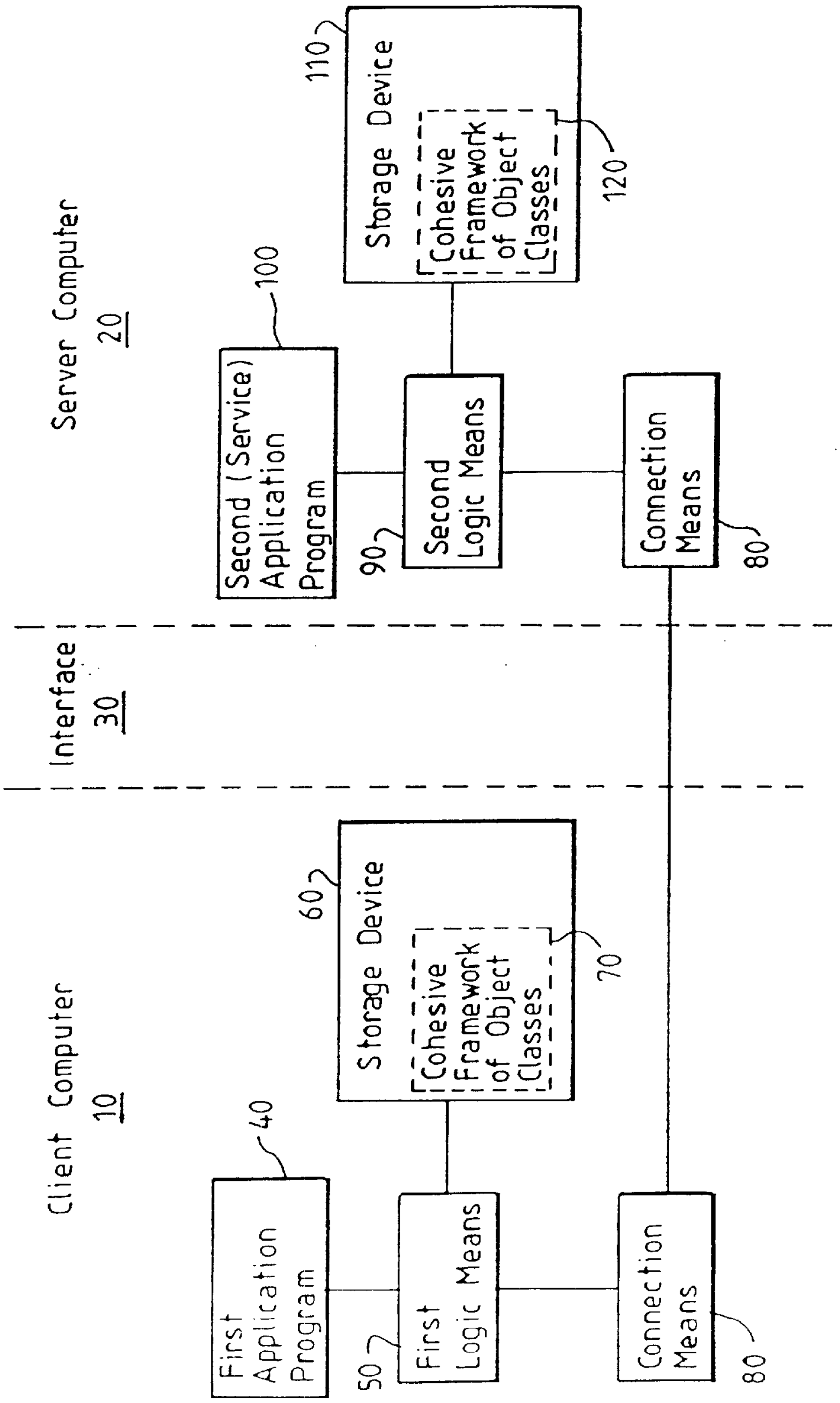
FIG. 1 is a block diagram of a well-known heterogeneous client/server architecture using object technology, in the context of which preferred embodiments of the present invention can be applied.
Figure 2:
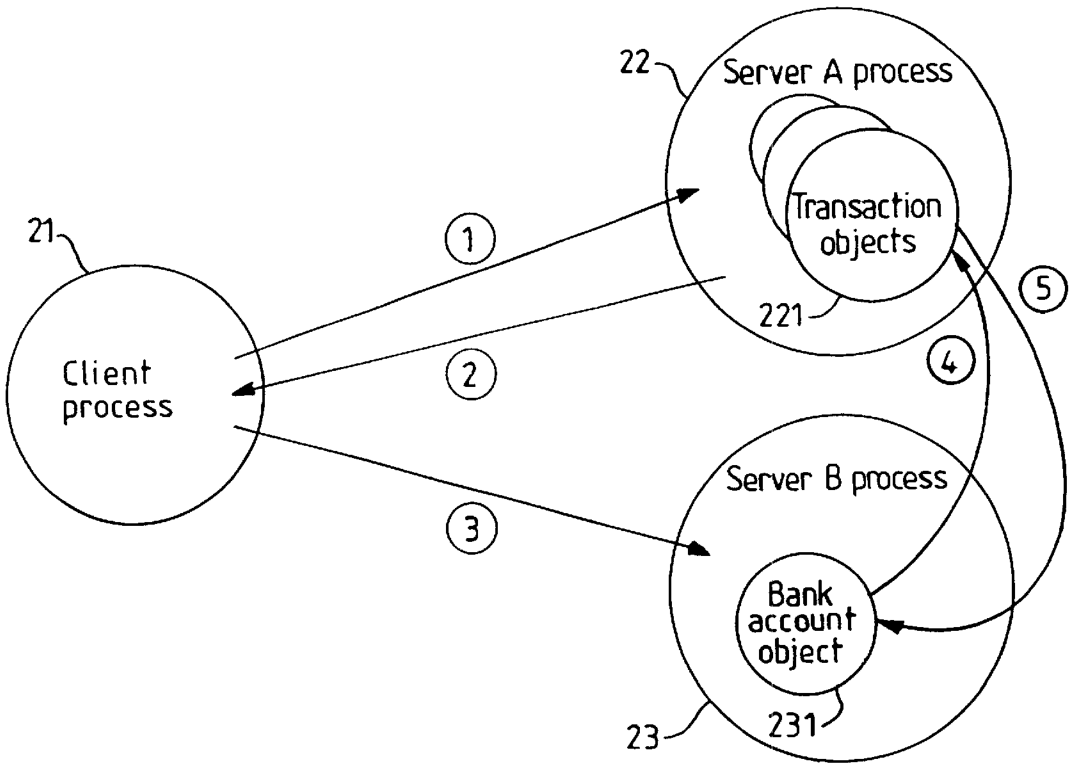
FIG. 2 is a block diagram showing a conventional OTS implementation.

The above describes an improvement which IBM has made to its original Component Broker Series product illustrated in FIG. 2, the improvement resulting in an intelligent placing of the transaction objects on the first server process that is called in the transaction. This improvement has been described in IBM's co-pending UK patent application 9800830.3, filed Jan. 16, 1998. However, there are many transactions in which the first server process to be called is not one where it would be most useful to have the transaction objects created.

For example, assume the first call in the transaction is an authentication call to an authentication business object for the purpose of authenticating the client (e.g., making sure the client is authorized to carry out this type of transaction). Locating the transaction objects in the server process containing this business object would not reduce the number of cross process flows, as this server process does not have a business object representing a resource that is being updated in the transaction. That is, if the transaction objects were created in this server process having the authentication business object, many cross process flows will be required at the end of the transaction since all of the business objects representing resources updated during the transaction will be resident in other server processes.

Another example is where the first call to a business object in the transaction is a read-only call to a business object representing a resource. For example, the first call in a transaction is requesting only to read the value of a bank account balance and is not requesting an update to any value in the business object representing the bank account resource. Again, in this case, it would not be advantageous to create the transaction objects in the server process containing this business object.

In order to give the client more control over which server process is selected to create the transaction objects, the present invention has been developed and the description of the preferred embodiment will now be resumed with respect to explaining this added functionality.

Figure 5:
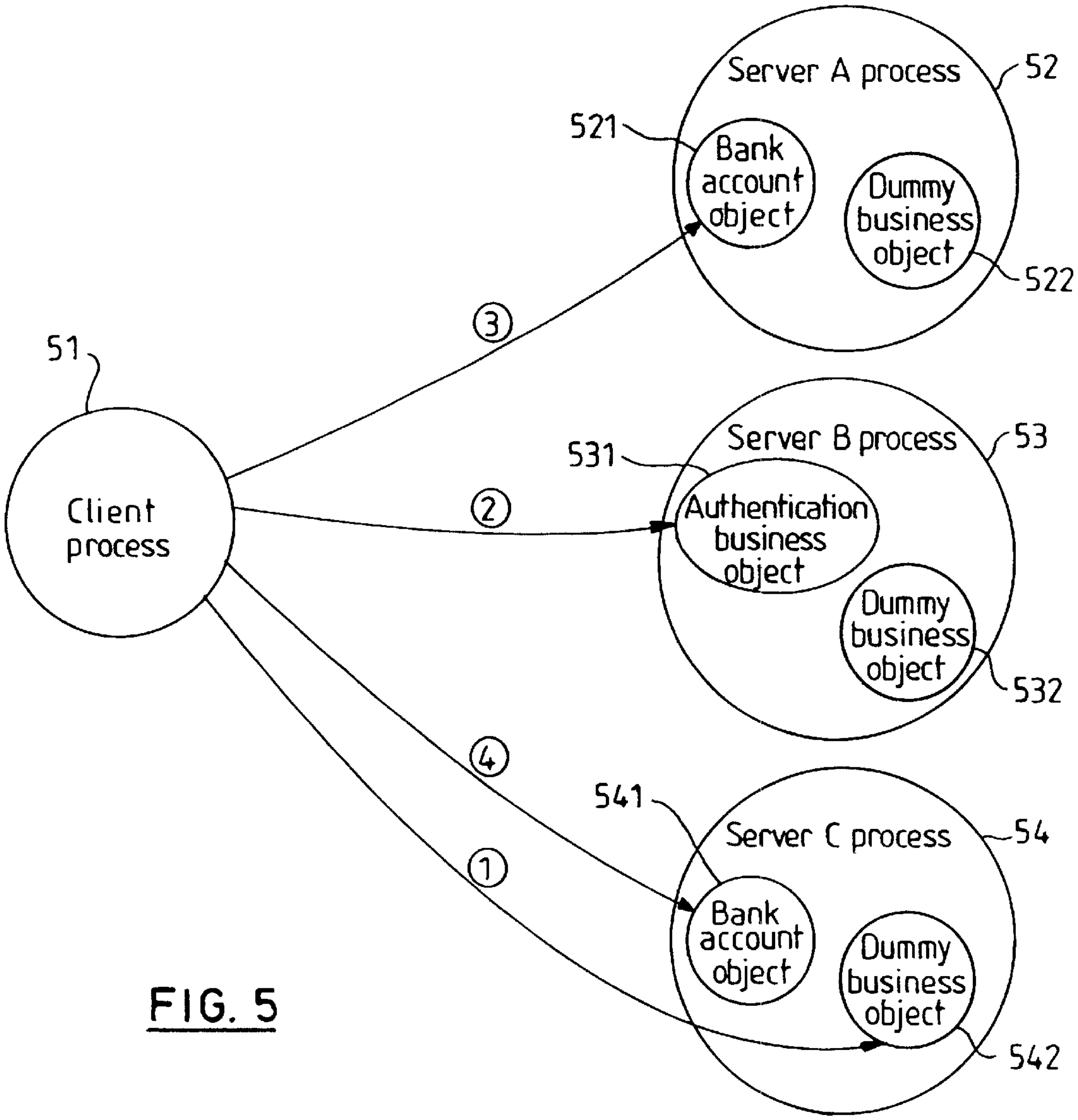
FIG. 5 is a block diagram showing an OTS implementation according to a preferred embodiment of the present invention.

In FIG. 5, client process 51 is instructing the processing of a transaction. The first call to a remote server process in the transaction is a call to an authentication business object 531 in server B process 53, for the purpose of authenticating the client 51. The second call to a remote process in the transaction is a call to the bank account object 521 in server A process for the purpose of simply reading the value of the balance of the bank account. The third call to a remote process in the transaction is a call to the bank account object 541 in server C process 54 for the purpose of reducing the value of the balance of this bank account to effect a withdrawal of funds.

In the above-described transaction, it would not be advantageous to create the transaction objects in server A process 52 or server B process 53, since there is no business object located in these processes that represents a resource that is updated in the transaction. Rather, it would be very advantageous to create the transaction objects in server C process 54, since this is the process that has the bank account object 541 that is being updated in the transaction.

The preferred embodiment of the present invention places dummy business objects 522, 532 and 542 in server processes 52, 53 and 54, respectively. These dummy business objects are each given a well-known key (for example, generated from the server name) so that the client 51 can easily locate any of the dummy business objects. The dummy business objects can be given any type of functionality, as long as they inherit from the CosTransactions::Transactional object. Their purpose is to provide an easily accessible object located on each of a plurality of servers so that the client can select any one server in the plurality as a place to site the transaction objects. The client 51 ensures that the first call to a remote process in the transaction is a call to the dummy business object in the server process where the client would like the transaction objects to be created. If a dummy business object is placed in a server, then that server is a candidate for selection by the client for locating the transaction objects.

For example, in FIG. 5, using the example given above, the first two calls of the client's transaction are calls to authentication business object 531 in process 53 and bank account object 521 in process 52. However, the client process 51 modifies the transaction so that the very first remote call (which is made to take place before these two calls) is a call to dummy business object 542 in server C process 54, since this is where the bank account object 541, which will be updated in the transaction, is located, and is thus the best process in which to locate the transaction objects.

Figure 6:
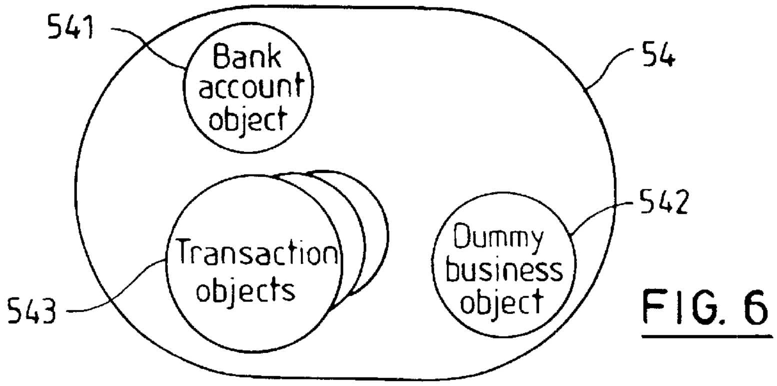
FIG. 6 is a block diagram showing a server process according to a preferred embodiment of the present invention.

Thus, as shown in FIG. 5, the client process 51 makes a first call (arrow with encircled number 1) to dummy business object 542 in server C process 54. This corresponds to step 42 of FIG. 4 but the client sends a call with a NULL transaction context to the dummy business object 542 rather than to the bank account object. The sole purpose of this call is to set up the transaction objects 543 (see FIG. 6) in server C process 54. The dummy business object recognizes the NULL transaction context in this first call from the client and proceeds to create the transaction objects in response to this recognition (this corresponds to step 43). Secondly, the client process makes a second call (arrow with encircled number 2) to authentication business object 531 in server B process 53 for authenticating the client. Thirdly, the client process makes a third call (arrow with encircled number 3) to the bank account object 521 in server A process 52 to read the balance of this bank account. Fourthly, the client process makes a fourth call (arrow with encircled number 4) to the bank account object 541 in server C process in order to reduce the balance of this account (since money is being withdrawn therefrom).

Once the server B process 53 creates the transaction objects locally, process 53 responds to the client with the valid transaction context (this corresponds to step 44).

Thus, the preferred embodiment of the present invention involves a client looking at a transaction it is about to run, determining which server process is best suited for locating the transaction objects on, and adding, at the beginning of the transaction, a call to a dummy business object located in the determined server process. This results in the transaction objects being created on this determined server process.

In a second embodiment, dummy business objects are not used. Instead, dummy methods are called on existing objects (e.g., bank account object 541). Thus, in this second embodiment, the very first call in the above example of FIG. 5 would be a call from client process 51 to the bank account object 541 invoking object 541's dummy method, e.g., bankacount.hello( ), which results in the transaction objects being created in the server process where the bank account object 541 is located.

We claim:

1. A client processing apparatus for use in a client/server computing system which carries out a distributed transaction in conjunction with a plurality of server processing apparatuses, the distributed transaction including a plurality of transactional calls to at least one of the server processing apparatuses, said client processing apparatus comprising:

means for selecting one of the plurality of server processing apparatuses as being the server processing apparatus which will host transaction objects which represent the distributed transaction;

means for creating an additional call in addition to the plurality of transactional calls which are included in the distributed transaction, the additional call being a call to the selected server processing apparatus, said additional call including a transaction context having a specific value which indicates to the selected server that a transaction has been started but that transaction objects which represent the transaction have not yet been created;

means for, before sending any of the plurality of transactional calls, sending the additional call to a dummy business object located at the selected server processing apparatus or for sending the additional call on a dummy method on an object located at the selected server processing apparatus;

means for receiving a modified transaction context from said selected server processing apparatus after said selected server processing apparatus has created said transaction objects; and means for sending the plurality of transactional calls to the at least one of the server processing apparatuses, passing the modified transaction context in the plurality of transactional calls.

2. The apparatus of claim 1 wherein said specific value is a NULL value.

3. The apparatus of claim 1 wherein the means for selecting selects a server processing apparatus which has a resource which is updated in the transaction.

4. A first server processing apparatus for use in a client/server computing system which carries out a distributed transaction in conjunction with a client processing apparatus, the distributed transaction including a plurality of transactional calls to at least one of a plurality of server processing apparatuses, the client apparatus comprising:

means for selecting the first server processing apparatus as being the server processing apparatus which will host transaction objects which represent the distributed transaction;

means for creating an additional call in addition to the plurality of transactional calls which are included in the distributed transaction, the additional call being a call to the first server processing apparatus, said additional call including a transaction context having a specific value which indicates to the first server processing apparatus that a transaction has been started but that transaction objects which represent the transaction have not yet been created;

means for, before sending any of the plurality of transactional calls, sending the additional call to a dummy business object located at the first server processing apparatus or for sending the additional call on a dummy method on an object located at the first server processing apparatus;

means for receiving a modified transaction context from said first server processing apparatus after said first server processing apparatus has created said transaction objects; and means for sending the plurality of transactional calls to the at least one of the server processing apparatuses, passing the modified transaction context in the plurality of transactional calls;

the first server processing apparatus comprising:

means for receiving the additional call;

means for recognizing the transaction context having the specific value in the additional call;

means for creating the transaction objects as a result of having recognized the transaction context having the specified value;

means for creating the modified transaction context; and means for returning the modified transaction context to the client processing apparatus.

5. The server processing apparatus of claim 4 wherein the specific value is the NULL value.

6. A client processing method for use in a client/server computing system which carries out a distributed transaction in conjunction with a plurality of server processing apparatuses, the distributed transaction including a plurality of transactional calls to at least one of the server processing apparatuses, said client processing method comprising steps of:

selecting one of the plurality of server processing apparatuses as being the server processing apparatus which will host transaction objects which represent the distributed transaction;

creating an additional call in addition to the plurality of transactional calls which are included in the distributed transaction, the additional call being a call to the selected server processing apparatus, said additional call including a transaction context having a specific value which indicates to the selected server that a transaction has been started but that transaction objects which represent the transaction have not yet been created;

before sending any of the plurality of transactional calls, sending the additional call to a dummy business object located at the selected server processing apparatus or for sending the additional call on a dummy method on an object located at the selected server processing apparatus;

receiving a modified transaction context from said selected server processing apparatus after said selected server processing apparatus has created said transaction objects; and sending the plurality of transactional calls to the at least one of the server processing apparatuses, passing the modified transaction context in the plurality of transactional calls.

7. The method of claim 6 wherein said specific value is a NULL value.

8. The method of claim 6 wherein the step of selecting selects a server processing apparatus which has a resource which is updated in the transaction.

9. A server processing method carried out at a first server processing apparatus for use in a client/server computing system which carries out a distributed transaction in conjunction with a client processing apparatus, the distributed transaction including a plurality of transactional calls to at least one of a plurality of server processing apparatuses, the client apparatus comprising:

means for selecting the first server processing apparatus as being the server processing apparatus which will host transaction objects which represent the distributed transaction;

means for creating an additional call in addition to the plurality of transactional calls which are included in the distributed transaction, the additional call being a call to the first server processing apparatus, said additional call including a transaction context having a specific value which indicates to the first server processing apparatus that a transaction has been started but that transaction objects which represent the transaction have not yet been created;

means for, before sending any of the plurality of transactional calls, sending the additional call to a dummy business object located at the first server processing apparatus or for sending the additional call on a dummy method on an object located at the first server processing apparatus;

means for receiving a modified transaction context from said first server processing apparatus after said first server processing apparatus has created said transaction objects; and means for sending the plurality of transactional calls to the at least one of the server processing apparatuses, passing the modified transaction context in the plurality of transactional calls;

the server processing method comprising steps of:

receiving the additional call;

recognizing the transaction context having the specific value in the additional call;

creating the transaction objects as a result of having recognized the transaction context having the specific value in the additional call;

creating the modified transaction context; and returning the modified transaction context to the client processing apparatus.

10. The server processing method of claim 9 wherein the specific value is the NULL value.

11. A computer program product stored on a computer readable storage medium for, when run on a computer system, carrying out the method of claim 6.

12. A computer program product stored on a computer readable storage medium for, when run on a computer system, carrying out the method of claim 9.

* * * * *